United States Patent [19]
Dickol et al.

[11] Patent Number: 5,898,885
[45] Date of Patent: Apr. 27, 1999

[54] METHOD AND SYSTEM FOR EXECUTING A NON-NATIVE STACK-BASED INSTRUCTION WITHIN A COMPUTER SYSTEM

[75] Inventors: John Edward Dickol; Bernard Charles Drerup; Richard Siegmund, Jr., all of Austin, Tex.

[73] Assignee: International Business Machines Corporation, Armonk, N.Y.

[21] Appl. No.: 08/829,024

[22] Filed: Mar. 31, 1997

[51] Int. Cl.[6] .................................................. G06F 15/00
[52] U.S. Cl. .................. 395/800.36; 395/378; 395/383; 395/800.34; 711/118; 711/119
[58] Field of Search ..................... 395/378, 383, 395/384, 385, 584, 701, 702, 703, 704, 705, 706, 707, 708, 709, 710, 800.23, 800.41, 800.36, 800.34; 711/118, 119

[56] References Cited

U.S. PATENT DOCUMENTS

| | | | |
|---|---|---|---|
| 4,587,612 | 5/1986 | Fisk et al. | 364/200 |
| 4,763,255 | 8/1988 | Hopkins et al. | 364/300 |
| 4,901,233 | 2/1990 | Liptay | 364/200 |
| 4,961,141 | 10/1990 | Hopkins et al. | 364/200 |
| 5,043,870 | 8/1991 | Ditzel et al. | 364/200 |
| 5,142,681 | 8/1992 | Driscoll et al. | 395/700 |
| 5,241,679 | 8/1993 | Nakagawa et al. | 395/725 |
| 5,355,460 | 10/1994 | Eickemeyer et al. | 395/375 |
| 5,388,235 | 2/1995 | Ikenaga et al. | 395/375 |
| 5,481,684 | 1/1996 | Richter et al. | 395/375 |
| 5,481,693 | 1/1996 | Blomgren et al. | 395/375 |
| 5,490,256 | 2/1996 | Mooney et al. | 395/375 |
| 5,542,059 | 7/1996 | Blomgren | 395/375 |
| 5,564,031 | 10/1996 | Amerson et al. | 395/419 |
| 5,598,560 | 1/1997 | Benson | 395/707 |
| 5,732,235 | 3/1998 | Kahle | 395/385 |
| 5,797,014 | 8/1998 | Gheith | 395/710 |

FOREIGN PATENT DOCUMENTS

| | | | |
|---|---|---|---|
| 301 609 0 | 8/1988 | WIPO | G06F 9/46 |

OTHER PUBLICATIONS

James Gosling, "Java Intermediate Bytecodes", ACM Sig Plan Notices, vol. 30, No. 3, Mar. 1995, pp. 111–118.

Amitava Bandyopadhyay and Yuan F. Zheng, "Combining Both Micro–Code and Hardwired Control in RISC", ECE Department, Clemson University.

Hseih et al., "Java bytecode to native code translation: The caffeine prototype and preliminary results", IEEE Computer Society Press, pp. 90–97, Dec. 1996.

Sun Microelectronics, PicoJava, I Microprocessor core architecture, http://www.sun.com/sparc/whitepapers/wpr–0014–01, Oct. 1996.

*Primary Examiner*—Larry D. Donaghue
*Assistant Examiner*—Stacy Whitmore
*Attorney, Agent, or Firm*—Casimer K. Salys; Antony P. Ng; Andrew J. Dillon

[57] ABSTRACT

A method and system for executing a non-native stack-based instruction within a computer system is disclosed. In accordance with the method and system of the present invention, a computer system capable of executing a set of non-native stack-access instructions is provided which includes a system memory, an instruction set convertor, and a processor. The system memory is utilized to store the non-native stack-access instructions, and part of the system memory is utilized as a stack. The instruction set convertor is utilized to convert the non-native stack-access instructions to a set of native instructions. When encountering a block of non-native stack-access instructions which include paired push and pop stack operations, the instruction set convertor produces a set of native instructions that ignores paired push and pop stack operations and retains all relevant number values in general purpose registers. The processor then processes the native instructions from the instruction set convertor, in which the immediate paired push and pop operations are eliminated.

13 Claims, 4 Drawing Sheets

| Java Instructions | Information Table OFF | Information Table ON | Information Table SYNC | Information Table REG_MOD | Semantics Table Skeleton Instruction | PowerPC™ Instruction | RS_BASE | RS_LEN |
|---|---|---|---|---|---|---|---|---|
| ICONST_0 | 0 | 1 | 0 | 100 | addi rS, r0, 0 | addi r7, r0, 0 | GPR_7 | 0 |
| ILOAD_1 | 0 | 1 | 0 | 100 | lwz rS, 4 (VARS) | lwz r8, 4(VARS) | GPR_7 | 1 |
| IADD | 2 | 1 | 0 | 111 | add rS, rS, rS+1 | add r7, r7, r8 | GPR_7 | 2 |
| ISUB | 2 | 1 | 0 | 111 | (automatic gen)<br>(automatic gen)<br>sub rS, rS, rS+1 | lwz r6, 0 (OPTOP)<br>addi OPTOP, OPTOP, -4<br>sub r6, r6, r7 | GPR_7 | 1 |
|  |  |  |  |  | (automatic gen) | stwu r6, 4 (OPTOP) | GPR_6 | 1 |
|  |  |  |  |  |  |  | GPR_6 | 0 |

Fig. 4

METHOD AND SYSTEM FOR EXECUTING A NON-NATIVE STACK-BASED INSTRUCTION WITHIN A COMPUTER SYSTEM

CROSS-REFERENCE TO A RELATED PATENT APPLICATION

The present invention is related to the subject matter of a co-pending United States Patent Application entitled "Method and System for Translating a Non-native Bytecode to a set of Codes Native to a Processor within a Computer System," filed of even date herewith, Ser. No. (IBM Docket No. AT9-96-342), and assigned to the assignee herein named. The content of the above-mentioned co-pending patent application is incorporated by reference herein.

BACKGROUND OF THE INVENTION

1. Technical Field

The present invention relates to an improved method and system for data processing in general and, in particular, to an improved method and system for processing non-native instructions within a computer system. Still more particularly, the present invention relates to an improved method and system for executing a non-native stack-based instruction within a computer system.

2. Description of the Prior Art

The World Wide Web, or as it is simply known, the "Web," has dramatically changed the online world and continues to grow in popularity. As a communications system, the Web allows information providers to distribute and collect information globally and instantly. For users, the Web is a dynamic view into the works and ideas of millions of people worldwide. Through a system of hypertext, users of the Web are able to select and view information from all over the Web. While the hypertext system gives Web users a high degree of selectivity over the information they choose to view, their level of interactivity with that information is low. Even with improvements such as hypermedia, which opens up many new kinds of sensory input for the Web users, including access to graphics and videos, the Web itself still lacks a true interactivity, that is, a kind of real-time, dynamic, and visual interaction between Web users and applications.

Java[1] brings this missing interactivity to the Web. With Java, animations and interactive applications on the Web become feasible. Java's features enrich communication, information, and interaction on the Web by enabling the distribution of executable content-rather than just Hypertext Markup Language (HTML) pages and hypermedia files-among Web users. This ability to distribute executable content is one of the powerful features of Java.

[1] Java is a trademark of Sun Microsystems, and is also the name of a programming language developed by Sun Microsystems.

In order to view and interact with animations and the interactive applications on the Web, a Web user must have a computer installed with a Java-enabled Web browser. Even so, because Java has an instruction set that is different from the instruction set of most, if not all, processors utilized within a Web user's personal computer, Java instructions typically cannot be executed in their original bytecode form. Hence, some form of translation from the Java instruction set to an instruction set associated with the processor within the personal computer is required. Conventionally, an instruction set associated with a particular processor is called a "native" instruction set to that computer, while an instruction set that is not specifically developed for that particular processor is called a "non-native" instruction set to that particular computer. In this case, Java would be a non-native instruction set with respective to a typical Web user's computer.

In addition, Java is also a stack-based instruction set, which means the operands and results of calculations are taken from, and stored to, a stack memory. The stack memory is usually implemented as a segment within the main memory of the Web user's computer. Most Java instructions require access to the stack memory. These instructions either get operands from the stack memory, store results to the stack memory, or move data between the stack memory and a local variable memory (or local memory) that is also part of the main memory. Calculations performed in a stack memory are typically different from calculations performed by a processor that utilizes a fixed number of General Purpose Registers (GPRs) to hold the operands and the results of the calculations.

As an example, the Java ILOAD instruction loads a value from the local memory and "pushes" it onto the stack memory. In order to accomplish this, the processor could execute a local_memory-to-GPR operation followed by a GPR-to-stack_memory operation. This requires a minimum of two native instructions. As another example, the Java ISTORE instruction does the opposite; it "pops" a value off the stack memory and stores the value to the local memory. In order to accomplish this, the processor could execute a stack-to-GPR operation followed by a GPR-to-local_memory operation. Again, this requires a minimum of two native instructions.

In most cases, pushing a value into the stack memory and then popping the same value off the stack memory without any other manipulation to the value is simply a natural result of the non-native code translation. Needless to say, these unnecessary redundant steps do not provide the most efficient native code for execution. Due to the large number of stack access instructions that are commonly encountered in a program written in Java, it is desirable to provide a more efficient method for executing these type of Java instructions within a computer system.

SUMMARY OF THE INVENTION

In view of the foregoing, it is therefore an object of the present invention to provide an improved method and system for data processing.

It is another object of the present invention to provide an improved method and system for processing non-native instructions within a computer system.

It is yet another object of the present invention to provide an improved method and system for executing a non-native stack-based instruction within a computer system.

In accordance with the method and system of the present invention, a computer system capable of executing a set of non-native stack-access instructions is provided which includes a system memory, an instruction set convertor, and a processor. The system memory is utilized to store the non-native stack-access instructions, and part of the system memory is utilized as a stack. The instruction set convertor is utilized to convert the non-native stack-access instructions to a set of native instructions. When encountering a block of non-native stack-access instructions which include paired push and pop stack operations, the instruction set convertor produces a set of native instructions that ignores both push and pop stack operations and retains all relevant number values in general purpose registers. The processor then processes the native instructions from the instruction set convertor, in which the immediate paired push and pop operations are eliminated.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 depicts an example of converting four Java instructions to a series of PowerPC™ instructions under the optimization method in accordance with a preferred embodiment of the present invention.

DETAILED DESCRIPTION OF A PREFERRED EMBODIMENT

The present invention may be executed in a variety of computers under a number of different operating systems. The computer may be, for example, a personal computer, a midrange computer or a mainframe computer. In addition, the computer may be part of a network such as a local-area network (LAN) or a wide-area network (WAN). For the purpose of illustration, a preferred embodiment of the present invention, as described below, is implemented on a computer system having a PowerPC™ processor manufactured by International Business Machines Corporation.

Figure 1:
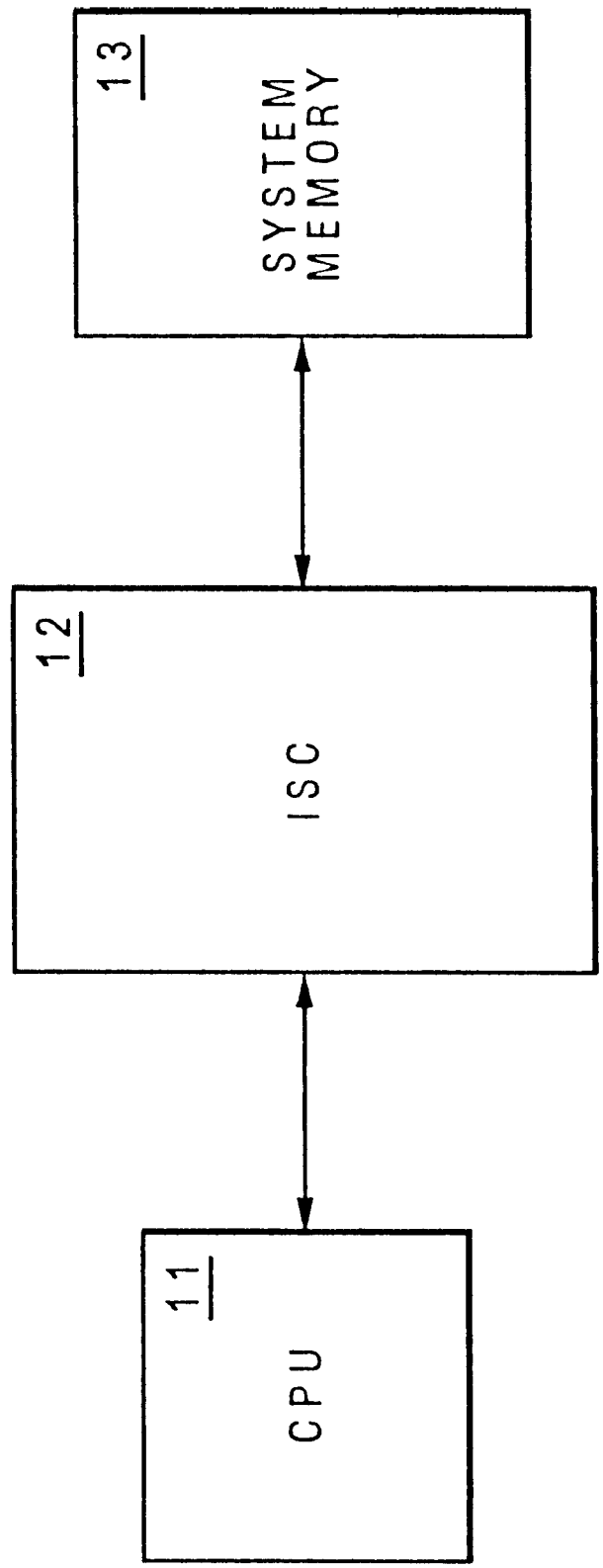
FIG. 1 is a block diagram of a system configuration that may be utilized by a preferred embodiment of the invention.

Referring now to the drawings and in particular to FIG. 1, there is depicted a block diagram of a system configuration that may be utilized by a preferred embodiment of the present invention. System configuration 10 includes a central processing unit (CPU) 11, an instruction set convertor (ISC) 12, and a system memory 13. As shown, ISC 12 is coupled between CPU 11 and system memory 13. Java programs consist of compiled Java instructions, are stored in system memory 13. When CPU 11 is performing an instruction fetch in system memory 13, ISC 12 determines what type of instruction CPU 11 is fetching. If the fetch is for a native instruction, then ISC 12 passes the fetch directly to system memory 13. However, if the fetch is for a non-native Java instruction, then ISC 12 performs the following steps:
  a. intercepting the instruction fetch before it reaches system memory 13;
  b. fetching corresponding Java instruction from system memory 13;
  c. translating the Java instruction to PowerPC™ instruction(s);
  d. returning the PowerPC™ instruction(s) to CPU 11.

The PowerPC™ instruction(s) from the translation is only passed to CPU 11 and is not stored anywhere in system memory 13.

Figure 2:
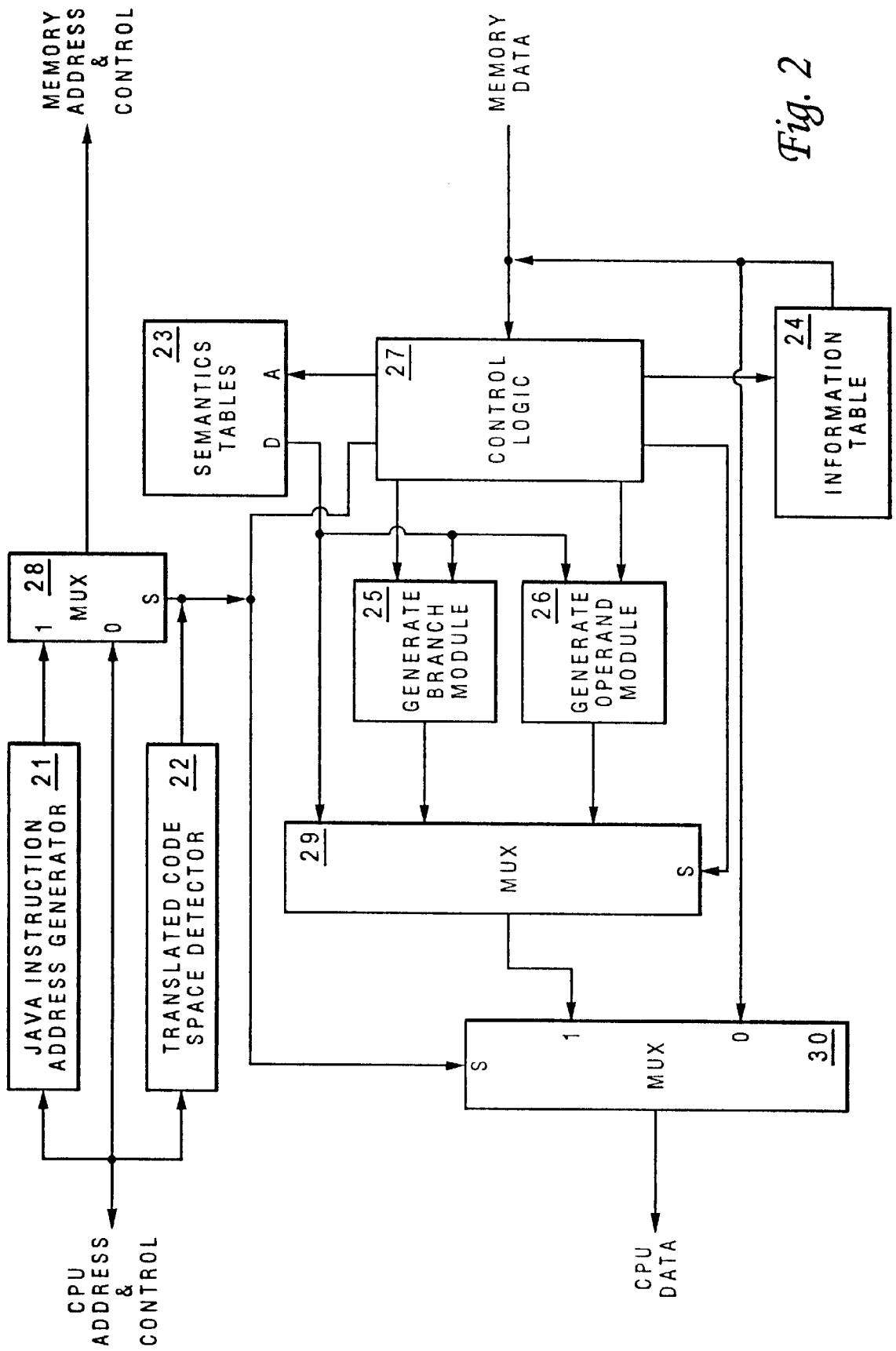
FIG. 2 is a detailed block diagram of the instruction set convertor of FIG. 1.

With reference now to FIG. 2, there is illustrated a detailed block diagram of the ISC in FIG. 1. During initialization, a segment of address space in CPU 11 is selected for the execution of Java programs as a "translated code space," and ISC 12 is informed of the location of this translated code space. An instruction fetch from CPU 11 is received by both Java Instruction Address Generator 21 and Translated Code Space Detector 22. By comparing the address of an instruction fetch to the translated code space, ISC 12 can determine whether the instruction fetch is for a native instruction or for a non-native Java instruction. If the instruction fetch is for a Java instruction, the fetch will be sent to system memory 13. System memory 13 then returns data back to control logic 27. Semantics Table 23 and Information Table 24 are then accessed for the translation of the non-native Java instruction to an instruction that is native to CPU 11. For certain Java instructions, Generate Branch Module 25 and Generate Operand Module 26 will also be accessed during the translation process. The translated instruction will be sent to CPU 11 via multiplexers 29 and 30.

Semantics Table 23 contains several sets of entries, each associated with one Java instruction. Each set of entries may include up to eight PowerPC™ instructions that direct CPU 11 to perform a set of operations required by a particular Java instruction. As a preferred embodiment of the present invention, Semantics Table 23 can store up to eight PowerPC™ instructions for each of the 256 possible Java opcodes. Thus, the total table size of Semantics Table 23 is 8 K bytes (i.e., 8 instructions * 4 bytes/instruction * 256 opcodes). When a Java instruction requires fewer than eight PowerPC™ instructions, the remaining entries in Semantics Table 23 will be left unutilized.

Similarly, information Table 24 contains several sets of entries, each associated with one Java instruction. Each set of entries comprises a three-bit Java-Length field, a three-bit PowerPC™-Length field, and an eight-bit Generate-Branch field. The Java-Length field indicates the length of a Java instruction. Possible lengths for a Java instruction are one, two, three, four, or five bytes and variable lengths. The PowerPC™-Length field indicates how many of the eight PowerPC™ instructions are utilized in a corresponding entry in Semantics Table 23. Each bit of the Generate-Branch field corresponds to a PowerPC™ instruction in Semantics Table 23 and indicates if that PowerPC™ instruction is a branch instruction that requires the generation of a branch offset.

Under prior art, as mentioned previously, at least two native instructions (i.e. a GPR-to-local_memory operation and a stack-to-GPR operation) are required for an ILOAD or an ISTORE Java instruction. The fact is that it is not always necessary for the GPR-to-stack_memory operation and the stack_memory-to-GPR operation to take place. Within a sequence of Java instructions, if a Java instruction that pushes a value onto the stack memory is followed by a Java instruction that pops that value off the stack memory, then the value could remain in a GPR.

As a preferred embodiment of the present invention, if a Java instruction pushes a value onto a stack memory, then a subsequent instruction within the same block (a block contains a maximum of eight native instructions) pops the value off the stack memory, ISC 12 will immediately recognize this situation and does not generate any native instructions to access the stack memory. By so doing, in most cases, the CPU only needs to execute a local_memory-to-GPR operation followed by a GPR-to-local_memory operation for handling both Java instructions.

Figure 3:
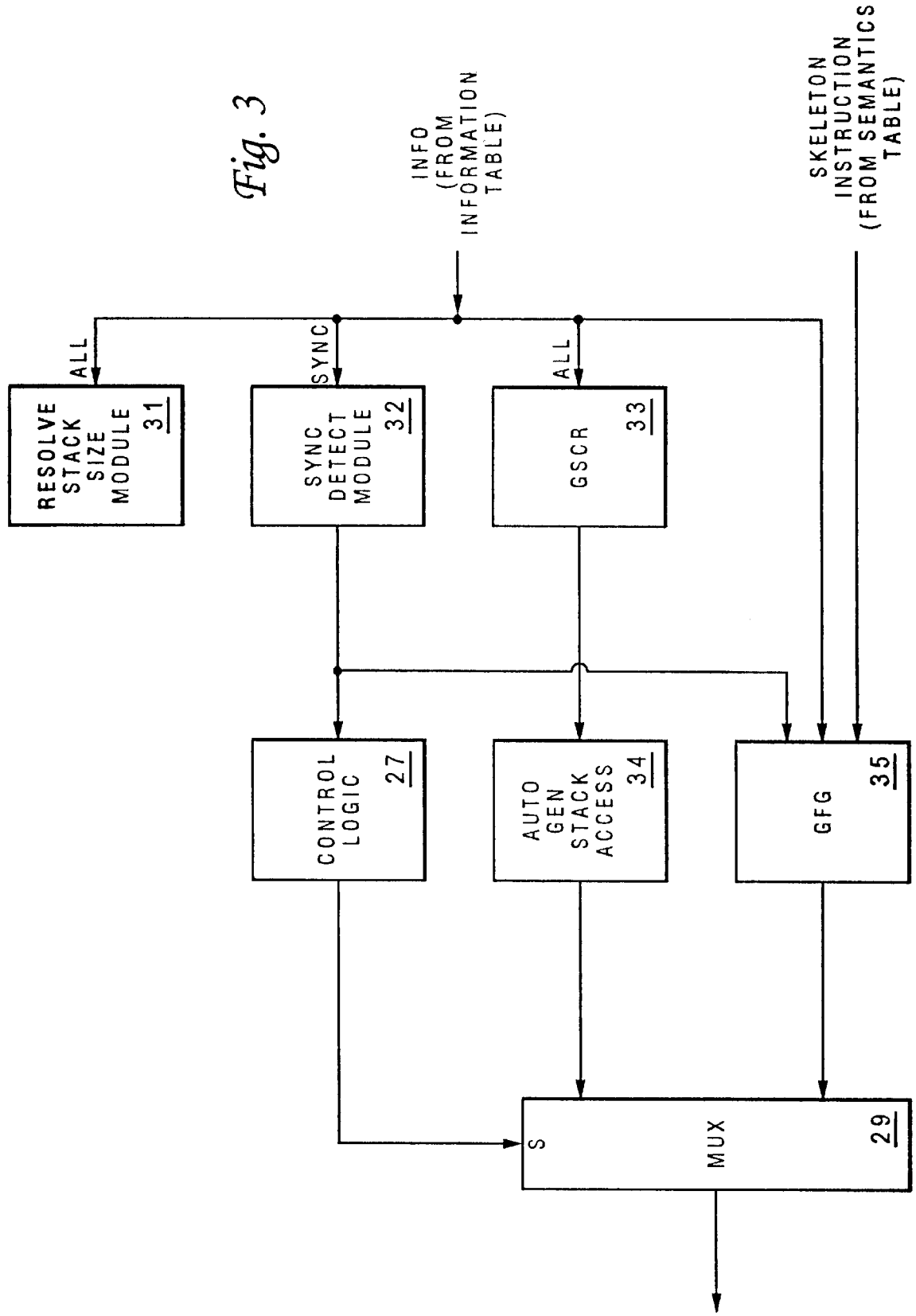
FIG. 3 is a detailed block diagram of the hardware within the instruction set convertor required for optimizing non-native stack-access instructions, in accordance with a preferred embodiment of the present invention.

Referring now to FIG. 3, there is illustrated a detailed block diagram of the hardware within ISC 12 of FIG. 1, which is required for optimizing non-native stack-access instructions, in accordance with a preferred embodiment of the present invention. As shown, information from information table 24 is sent to Resolve Stack Size module 31, Sync Detect module 32, GPR Stack Control Register (GSCR) 33, and GPR field Generator (GFG) 35. Resolve Stack Size module 31 is utilized to calculate how many instructions are required to push from the GPR to the stack memory, and the output is then utilized to determine how many Java instruction can fit into a block. Sync Detect module 32 is utilized to determine if a branch is being generated. Combining the information from Information Table 24 with skeleton instructions from Semantics Table 23, a set of PowerPC™ instructions is generated by GFG 35.

GSCR 33 includes two registers, namely, RS_BASE and RS_LEN. Typically, all GPRs within a CPU are numbered sequentially, e.g. from 0 through 31 for PowerPC™, and RS_BASE indicates which GPR is the first that contains stack values while RS_LEN indicates the quantity of stack values in the GPRs. Thus, those GPRs with number RS_BASE through RS_BASE+RS_LEN-1 contain the pertinent stack values.

In order to keep track of how each Java instruction affects the stack memory, four additional fields to those mentioned previously are utilized within Information Table 24 for associating with each Java instruction. These additional fields includes:

1. RS_OFF: This field indicates the number of items that a Java instruction pops off the stack.
2. RS_ON: This field indicates the number of items that a Java instruction pushes onto the stack.
3. RS_SYNC: This field indicates that the stack memory must be resolved before any instruction can be further processed.
4. RS_REG_MOD: This field indicates which fields of the native instruction must be modified in order to access a GPR in which a stack element is held.

In addition, the set of native instructions, stored within Semantics Table 23 and associated with each Java instruction does not include instructions for stack memory accesses. Only the instructions for the "core" operations are included. Instead, Auto Gen Stack Access 34 "automatically" generates all native instructions required for stack memory accesses. The four additional fields are utilized in the following manner:

1. RS_OFF: If the GPRs currently contain more stack values than the current Java instruction requires off the stack memory (i.e., pops), then the values are taken directly from the GPRs, and no accesses to stack memory are generated. However, if the Java instruction requires more stack values than are currently in the GPRs, then the ISC automatically generates native instructions that load the appropriate number of stack values from stack memory.
2. RS_ON: This value is utilized so the ISC can keep track of how many stack values are stored in the GPRs. This is utilized in maintaining the GSCRs.
3. RS_SYNC: If RS_SYNC is active, then all stack values currently held in GPRs are pushed to the stack memory before the base instructions (from the Semantics Table) are processed. This is utilized for Java instructions such as GOTO, where the native code generated includes a branch that exists the block.
3. RS_REG_MOD: Since the ISC dynamically allocates GPRs to hold stack values, the specific GPR where a stack value can be found is not predetermined. Thus, every native instruction generated that accesses the stack memory has one or more fields of the native instruction filled in by the GFG logic. The RS_REG_MOD bits that are set indicate that the corresponding field in the native instruction requires this action.

Most native instructions, such as PowerPC™ instructions include fields that indicate which GPRs the instruction is to act on. To perform the stack-access optimization described above, GFG 35 controls how these fields of the native instructions are generated. When generating a native instruction that acts on an operand from the stack memory, the CPR in which the operand resides is variable. Thus, the fields of the native instruction where the GPR numbers of the operands are specified must be filled in by GFG 35.

Also, when generating a native instruction that produces a result that is pushed to the stack memory, the GPR where the result is saved is variable, and is based on the availability of unutilized GPRs. Thus, the field of the native instruction where the GPR number of the result is specified must be filled in by GFG 33. To control this, each instruction from Semantics Table 23 has a corresponding field, RS_REG_MOD, in Information Table 24 that indicates which fields of the native instruction are stack accesses. The ISC utilizes this data to determine when and where it must fill in the GPR numbers.

As a preferred embodiment of the present invention, a method for optimizing non-native stack-access instructions is performed as follows:

1. At the beginning of a block, the GPRs and the stack memory are in a predetermined state, such as all stack items are in stack memory (no stack items in GPRs).
2. When converting a non-native instruction that pushes its results to the stack memory, no native instructions are generated for the stack push. Instead, the results remain in GPRs. The ISC keeps track of which GPRs hold which stack values. The GSCRs are the set of registers within the ISC that contain this information.
3. When converting a non-native instruction that pops an operand from the stack memory, the ISC only generates native instructions for the stack pops if the operands are not already in GPRS. If the operands are already in GPRs, then they are accessed directly from there. The ISC checks the GSCRs to determine which of the operands needed by the Java instruction are stored in the GPRs.
4. At the end of the block, or before any branch instructions that transfers control out of the block as indicated by RS_SYNC, the stack memory is "resolved" by restoring the GPRs and the stack memory to the predetermined state, such as pushing all stack values in the GPRs out to stack memory. The destination of all branches is the beginning of a block. This ensures the state of the stack memory (and GPRs) are known. (Note: The non-native stack-access instructions optimization may only be performed within a block of native code.)

With reference now to FIG. 4, there is depicted an example of converting four Java instructions to a series of PowerPC™ instructions under the optimization method in accordance with a preferred embodiment of the present invention. The first two Java instructions push values onto the stack memory. The corresponding PowerPC™ instructions store the results in GPR_7 and GPR_8 accordingly. The Third Java instruction adds the top two stack values and stores the result on the stack memory. The corresponding PowerPC™ instructions take the operands from GPR_7 and GPR_8 and store the result in GPR 7. The fourth Java instruction subtracts the top two stack values and stores the results to the stack memory. Because the GPRs only contain one stack value (GPR_7), two PowerPC™ instructions are automatically generated to load a value from the stack memory into GPR_6. Then, a subtraction is performed on GPR_6 and GPR_7 with the result stored in GPR_6. Finally, before the end of the block, one instruction is automatically generated to resolve the stack memory by storing GPR_6 to the stack memory.

As has been described, the present invention provides an improved method for executing non-native stack-access instruction within a computer system. Without any optimization, Java stack-access instructions such as ILOAD and ISTORE require operations from memory to register, register to stack memory, stack to register, and register to memory. With optimization under the present invention, previous operations are reduced to memory to register and register to memory. Due to the large number of stack-access instructions commonly encountered within a typical program written in Java, the present invention allows the Java program to be executed in a more efficient manner.

While the invention has been particularly shown and described with reference to a preferred embodiment, it will be understood by those skilled in the art that various changes in form and detail may be made therein without departing from the spirit and scope of the invention.

What is claimed is:

1. A computer system capable of executing a plurality of non-native stack-access instructions, said computer system comprising:

a memory for storing said plurality of non-native stack-access instructions;

an instruction set convertor, which includes a Resolve Stack Size module, a Sync Detect module, and an Auto Gen Stack Access module, for converting said plurality of non-native stack-access instructions to a plurality of native instructions by translating a block of non-native stack-access instructions that includes a pair of push and a pop stack operations to a set of native instructions that omits said pair of push and pop stack operations while retaining all relevant number values in a plurality of registers, such that said pair of push and pop operations is eliminated; and a processor for processing said plurality of native instructions.

2. The computer system according to claim 1, wherein said plurality of non-native instructions are Java instructions.

3. The computer system according to claim 1, wherein a size of said block is at least eight instructions.

4. The computer system according to claim 1, wherein part of said memory is utilized as a stack.

5. The computer system according to claim 1, wherein said processor includes said plurality of registers.

6. A method for executing a plurality of non-native stack-access instructions, said method comprising the steps of:

storing said plurality of non-native stack-access instructions in a memory, wherein part of said system memory is utilized as a stack;

converting said plurality of non-native stack-access instructions by utilizing an instruction set converter having a Resolve Stack Size module, a Sync Detect module, and an Auto Gen Stack Access module, to a plurality of native instructions by altering a block of non-native stack-access instructions that includes a pair of push and a pop stack operations to a set of native instructions that omits said pair of push and pop stack operations while retaining all relevant number values in a plurality of registers, such that said pair of push and pop stack operations is eliminated; and processing said plurality of native instructions with a processor, wherein said processor includes said plurality of registers.

7. The method according to claim 6, wherein said plurality of non-native instructions are Java instructions.

8. The method according to claim 6, wherein a size of said block is eight instructions.

9. A computer system capable of executing a plurality of non-native stack-access instructions, said computer system comprising:

a memory for storing said plurality of non-native stack-access instructions;

an instruction set convertor, which includes an information table having a RS_OFF field, a RS_ON field, a RS_SYNC field, and a RS_REG_MOD field, for converting said plurality of non-native stack-access instructions to a plurality of native instructions by translating a block of non-native stack-access instructions that includes a pair of push and a pop stack operations to a set of native instructions that omits said pair of push and pop stack operations while retaining all relevant number values in a plurality of registers, such that said pair of push and pop operations is eliminated,; and a processor for processing said plurality of native instructions.

10. The computer system according to claim 9, wherein said plurality of non-native instructions are Java instructions.

11. The computer system according to claim 9, wherein a size of said block is at least eight instructions.

12. The computer system according to claim 9, wherein part of said memory is utilized as a stack.

13. The computer system according to claim 9, wherein said processor includes said plurality of registers.

* * * * *

UNITED STATES PATENT AND TRADEMARK OFFICE
CERTIFICATE OF CORRECTION

PATENT NO. : 5,898,885
DATED : August 27, 1999
INVENTOR(S) : Dickol et al.

It is certified that error appears in the above-identified patent and that said Letters Patent is hereby corrected as shown below:

Col. 6, Line 15 delete "33" and replace with --35--.

Signed and Sealed this

Third Day of April, 2001

Attest:

NICHOLAS P. GODICI

*Attesting Officer*   *Acting Director of the United States Patent and Trademark Office*